United States Patent
Alshafei (10) Patent No.: US 11,986,754 B2
(45) Date of Patent: May 21, 2024

(54) CONTROLLING DEGRADATION IN A REBOILER VIA HIGHER SURFACE ROUGHNESS

(71) Applicant: SAUDI ARABIAN OIL COMPANY, Dhahran (SA)

(72) Inventor: Hasan M. Alshafei, Saihat (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 0 days.

(21) Appl. No.: 17/655,059

(22) Filed: Mar. 16, 2022

(65) Prior Publication Data
US 2023/0294015 A1   Sep. 21, 2023

(51) Int. Cl.
*B01D 3/32* (2006.01)
*B01D 3/26* (2006.01)
*B01D 53/14* (2006.01)

(52) U.S. Cl.
CPC .......... *B01D 3/322* (2013.01); *B01D 3/26* (2013.01); *B01D 53/1425* (2013.01);
(Continued)

(58) Field of Classification Search
CPC ...... B01D 3/26; B01D 3/322; B01D 53/1425; B01D 53/1493; B01D 2252/103; B01D 2252/20478
See application file for complete search history.

(56) References Cited

U.S. PATENT DOCUMENTS

| | | | |
|---|---|---|---|
| 2,742,347 A * | 4/1956 | Carlson | B01J 8/0453 422/605 |
| 5,510,567 A * | 4/1996 | Lermite | B01D 53/1425 95/149 |

(Continued)

FOREIGN PATENT DOCUMENTS

| | | |
|---|---|---|
| CN | 201497394 U | 6/2010 |
| EP | 2609988 A1 | 7/2013 |

(Continued)

OTHER PUBLICATIONS

Davis, Jason and Gary Rochelle, "Thermal degradation of monoethanolamine at stripper conditions", Energy Procedia, ScienceDirect, Elsevier, vol. 1, 2009, pp. 327-333 (7 pages).
Gorenflo, Dieter and David Kenning, "Pool Boiling", VDI Heat Atlas, Second Edition, Spring-Verlag, 2010, 1st edition published in 1993 by VDI-Verlag GmbH, pp. 757-792 (36 pages).

(Continued)

*Primary Examiner* — Jonathan Miller
(74) *Attorney, Agent, or Firm* — Osha Bergman Watanabe & Burton LLP (57) ABSTRACT

An alkanolamine gas treatment unit system that may comprise an absorber column, a regenerator column, and a once-through natural circulation vertical thermosyphon reboiler comprising a reboiler tube and a shell. The reboiler may be a steam driven one having a process side and a shell side, wherein the process side is inside the reboiler tube, the process side of the reboiler and the regenerator column are in fluid communication with one another, an inner surface of the reboiler tube, on the process side, has a surface roughness of 0.06 μm or greater, the shell side of the reboiler is in fluid communication to a steam source, and the regenerator column and the absorber column are in fluid communication with one another. An absorbent regenerator system that may comprise the regenerator column and the once-through natural circulation vertical thermosyphon reboiler.

11 Claims, 4 Drawing Sheets

(52) U.S. Cl.
CPC .... *B01D 53/1493* (2013.01); *B01D 2252/103* (2013.01); *B01D 2252/20478* (2013.01)

(56) References Cited

U.S. PATENT DOCUMENTS

| | | | |
|---|---|---|---|
| 7,569,194 B2* | 8/2009 | Russell | F22B 1/1838 |
| | | | 423/220 |
| 8,080,089 B1* | 12/2011 | Wen | B01D 53/1475 |
| | | | 95/174 |
| 11,524,249 B2* | 12/2022 | AlShafei | B01D 53/1462 |
| 2008/0009405 A1* | 1/2008 | Russell | F22B 1/1838 |
| | | | 502/56 |
| 2010/0122899 A1 | 5/2010 | Hartman et al. | |
| 2014/0005995 A1 | 1/2014 | O'Connor et al. | |
| 2015/0157980 A1 | 6/2015 | Mochizuki et al. | |
| 2016/0236140 A1* | 8/2016 | Northrop | B01D 53/1462 |
| 2020/0039825 A1* | 2/2020 | Rameshni | B01D 53/1418 |
| 2020/0061574 A1* | 2/2020 | Ikeda | B01D 1/16 |
| 2021/0278144 A1* | 9/2021 | Blokhin | F28F 13/182 |

FOREIGN PATENT DOCUMENTS

| | | |
|---|---|---|
| JP | 4413416 B2 | 2/2010 |
| JP | 2012076065 A | 4/2012 |

OTHER PUBLICATIONS

Hatchell, Daniel, et al., "Thermal degradation of linear amines for CO2 capture", Energy Procedia, Elsevier, vol. 63, 2014, pp. 1558-1568 (11 pages).

Jones, B.J., et al., "The Influence of Surface Roughness on Nucleate Pool Boiling Heat Transfer", Journal of Heat Transfer, ASME, vol. 131, Dec. 2009, pp. 121009-1-121009-14 (14 pages).

Kang, Myeong-Gie, "Effect of surface roughness on pool boiling heat transfer", International Journal of Heat and Mass Transfer, Pergamon, Elsevier, vol. 43, 2000, pp. 4073-4085 (26 pages).

Saeed, Idris, et al., "Thermal degredation of diethanolamine at stripper condition for CO2 capture; Product Types and Reaction Mechanism", Chinese Journal of Chemical Engineering, ScienceDirect, Elsevier, 2018, pp. 1-17 (18 pages).

* cited by examiner

CONTROLLING DEGRADATION IN A REBOILER VIA HIGHER SURFACE ROUGHNESS

BACKGROUND

A natural gas plant receives a feed comprising light hydrocarbons and contaminants to be processed. Contaminants typically in the feed include acid gas, which may include $H_2S$, $CO_2$, and COS. Acid gas hinders the production and separation of gaseous hydrocarbon in the natural gas plant. This acid gas may also cause corrosion and contaminate a product stream.

To mitigate the effect of acid gas, a natural gas plant may have an absorber column that absorbs the acid gas with an amine absorbent. The rich amine absorbent is then fed to a regenerator column to release the absorbed acid gas from the absorbent. When acid gas is released, a lean absorbent is produced for recycle and reuse.

In the absorber column, hydrocarbon is separated from contaminants. In the regenerator column, contaminants are separated from absorbent. A natural gas plant regenerator column, however, typically runs at a regeneration temperature that causes undesirable absorbent degradation.

SUMMARY

This Summary is provided to introduce a selection of concepts that are further described below in the Detailed Description. This summary is not intended to identify key or essential features of the claimed subject matter, nor is it intended to be used as an aid in limiting the scope of the claimed subject matter.

In one aspect, one or more embodiments of the disclosure relate to an alkanolamine gas treatment unit system that includes an absorber column; a regenerator column; and a once-through natural circulation vertical thermosyphon reboiler comprising reboiler tubes and a shell. The reboiler may be a steam driven reboiler having a process side and a shell side, wherein the process side is inside the reboiler tubes, the process side of the reboiler and the regenerator column are in fluid communication with one another, an inner surface of the reboiler tubes, on the process side, has a surface roughness of 0.06 µm or greater, the shell side of the reboiler is in fluid communication to a steam source, and the regenerator column and the absorber column are in fluid communication with one another.

In another aspect, one or more embodiments relate to an absorbent regenerator system that may comprise a regenerator column, and a once-through natural circulation vertical thermosyphon reboiler comprising reboiler tubes and a shell. The reboiler may be steam driven having a process side and a shell side, the process side is inside the reboiler tubes, the process side of the reboiler and the regenerator column are in fluid communication with one another, an inner surface of the reboiler tube, on the process side, has a surface roughness of 0.06 µm or greater, the shell side of the reboiler is in fluid communication to a steam source, and the regenerator column and the absorber column are in fluid communication with one another.

Other aspects and advantages of the claimed subject matter will be apparent from the following description and the appended claims.

BRIEF DESCRIPTION OF DRAWINGS

In the figures, a "'" refers to the same element in a different state, that is, all other aspects of the elements are the same but for a modification in operation.

DETAILED DESCRIPTION

Hydrocarbons produced from a reservoir are often mixed with non-hydrocarbon gases. Such non-hydrocarbon gases include contaminants such as hydrogen sulfide ($H_2S$), carbon dioxide ($CO_2$), carbon monoxide (CO), and carbonyl sulfide (COS). Mercaptans may also be mixed with the hydrocarbon gases produced. When acid gases such as $H_2S$ or $CO_2$ are produced as part of a light hydrocarbon gas stream, such as methane, ethane, and/or propane, the raw natural gas is referred to as a "sour" natural gas. The $H_2S$ and $CO_2$ are referred to as "acid gases."

Sour natural gas is treated to remove the $H_2S$ and $CO_2$ before it can be further processed or used as an environmentally-acceptable fuel. Embodiments herein are directed toward the sweetening of a natural gas or other light hydrocarbon streams containing acid gases.

As a result of the gas sweetening process, a treated or "sweetened" gas stream is produced. The sweetened gas stream is substantially depleted of $H_2S$ and $CO_2$. The sweetened gas stream can then be further processed for liquids recovery, may be sold into a pipeline or may be used for liquefied natural gas (LNG) feed, as a feedstock for a gas-to-liquids processes, or other well-known end uses.

Physical components involved in an alkanolamine gas treatment process (acid gas removal of natural gas sweetening) include an absorber column, a regenerator column, and a reboiler. The regenerator column contains the hotter side of the process; the absorber column contains the cooler side of the process. The "hot side" of the process includes a regenerator column and a reboiler coupled to the regenerator column. One or more embodiments of the present disclosure relate to the reboiler of the regenerator column.

A reboiler provides heat to the regenerator column. The reboiler includes a steam shell and reboiler tubes. The reboiler tubes are housed within the shell. This reboiler configuration has a process side and a shell side. The space inside of the reboiler tubes is the "process side." The space between the outer surface of the reboiler tubes and the inner surface the shell housing is the "shell side."

On the process side, the reboiler is configured to facilitate "process fluid" flow through the inside of reboiler tubes. Process fluid means a fluid in the process side of the reboiler. An example of a process fluid is an aqueous alkanolamine solution.

On the shell side, the reboiler is configured to facilitate flow of a heat exchange medium, such as steam, to flow within the shell, outside of the reboiler tubes. The heat exchange medium contacts the outer surface of the reboiler tubes and transfers heat to the reboiler tube walls. When applied, the heat transfers through the reboiler tube walls and heats the process fluid inside of the reboiler tubes.

Heating of the aqueous alkanolamine solution process fluid in the reboiler tubes may create a two-phase mixture (liquid and gas) that is sent back to the regenerator column along with heat. However, when an aqueous alkanolamine solution flows through the inside of hot reboiler tubes, the alkanolamine may thermally degrade with time due to excess heat exposure. Embodiments herein may minimize or eliminate this unwanted degradation of the alkanolamine.

In one or more embodiments, the reboiler tubes have at least a portion of their inner surface configured as a roughened inner surface. As compared to a tube having a smooth inner surface, the roughened (textured) inner surface of the reboiler tubes promotes or facilitates boiling of the mixture. The roughened inner surface of the reboiler tubes increases nucleate heat transfer coefficients compared to an inner surface that is not roughened. Thus, the desired release of absorbed acid gases and heat transfer may be effected (performed) at a lower reboiler temperature, reducing or preventing adsorbent or solvent (alkanolamine) degradation. Accordingly, a higher tube surface roughness will minimize solvent losses, reduce steam consumption, and enhance process integrity compared to an inner tube surface that is not roughened.

One or more embodiments of the disclosure relate to an alkanolamine gas treatment unit ("ATU") system. The ATU system includes an absorber column, a regenerator column, and a reboiler.

Alkanolamine Cycle

In an ATU system where alkanolamines are used for acid gas removal, an alkanolamine solution flows in a cycle to extract acid gases from natural gas. At different parts of the cycle, the alkanolamine solution is either lean or rich. A "rich" alkanolamine solution has an acid gas component. A "lean" alkanolamine solution has a depleted acid gas component, as compared to a rich alkanolamine solution. A depleted acid gas component is the amount of acid gas component remaining in solution after treatment in the ATU system. Even for a lean alkanolamine solution passing from the reboiler after treatment, a small amount of acid gas will typically remain in solution.

Lean alkanolamine solution is fed from the regenerator column to the absorber column, where it is contacted with a sour gas. When a lean alkanolamine solution and an acid gas first intermingle during the cycle, in the absorber column, they form a complex that chemically binds together. The alkanolamine traps the acid gas. This complexed alkanolamine is the majority form of alkanolamine in a rich alkanolamine solution. So, when an acid gas is introduced into a lean alkanolamine solution, it becomes a rich alkanolamine solution. Because of the alkanolamine's ability to chemically bind and trap, it is an absorbent. Meaning, alkanolamine absorbent absorbs (soaks up) acid gas absorbate in solution.

The rich alkanolamine solution, containing trapped acid gas, is then fed from the absorber column to regenerator column for regeneration of the absorbent solution for continued use in the cycle. When the rich alkanolamine solution is treated to remove acid gas during the cycle, in the regenerator column, the aforementioned complex breaks apart and the acid gases may be separated and recovered, and the alkanolamine solution may again be cycled to the absorber column. Alkanolamine and acid gas are freed from each other, no longer trapped by chemical bonds. This free alkanolamine is the majority form of alkanolamine in a lean alkanolamine solution.

Within the ATU system, it can be said that the start of the cycle begins at the absorber column. In the absorber column, lean alkanolamine solution intermingles with natural gas contaminated with acid gas. The lean alkanolamine solution traps incoming acid gas and separates it out of the natural gas. The alkanolamine and acid gas complex is now considered a rich alkanolamine solution. Rich alkanolamine solution passes from the absorber column to the regenerator column. In the regenerator column, heat supplied by the reboiler contacts the rich alkanolamine solution and breaks apart the alkanolamine and acid gas complex. The fresh (lean) alkanolamine is sent back to the absorber column. The freed acid gas is passed from the regenerator column. This acid gas may be further processed in other system components before passing from the system.

Alkanolamine

Alkanolamine adsorbent systems useful according to embodiments herein may include aqueous solutions containing one or more alkanolamines. Alkanolamines useful in embodiments herein may include but are not limited to, diglycolamine (DGA), morpholine, monoethanolamine (MEA), piperazine (PZ), methyldiethanolamine (MDEA), and diethanolamine (DEA). The concentration ranges of the alkanolamine in the aqueous solutions that are used may vary based upon the particular alkanolamine that is used. For example, the concentration of MEA may be in a range of from 10 to 20 wt % of the total aqueous solution, while a concentration of DEA may be in a range of from 25 to 35 wt % of the total aqueous solution.

In one or more embodiments, a lean alkanolamine solution includes lean alkanolamine, an alkanolamine without an acid gas component, or an alkanolamine with a depleted acid gas component. The lean alkanolamine is not particularly limited so long as it is suitable for removing acid gas components from a sour gas feed. Restated, following regeneration in the regeneration column, the lean alkanolamine may have some acid gas remaining, but has a capacity to absorb acid gas components from a sour gas feed.

As previously mentioned, when alkanolamine is excessively heated, degradation may occur. The degradation temperature is specific to the individual alkanolamine. Alkanolamine degradation products include, but are not limited to, heat stable salts (HSS), urea (such as N,N-bis (hydroxyethoxyethyl)urea (BHEEU)), and non-volatile organic acids.

Alkanolamines, including, but not limited to, DGA, MEA, and DEA, may start to degrade at 132° C. (270° F.). MEA degradation rate, for example, may vary from 2.5 mol % to 6.0 mol % per week at 135° C. DGA may degrade at 8-10 mol % at 135° C.

Excessive degradation may lead to solvent losses. Such solvent losses may result in high solvent costs over time, where solvent must be replenished in the cycle.

Alkanolamine Gas Treatment Unit System

In one or more embodiments, an alkanolamine gas treatment unit (ATU) system is provided for natural gas sweetening and acid gas removal. The ATU may include various unit operations, including an absorber column, a regenerator column, and a reboiler. The absorber column is coupled fluidly to and in fluid communication with the regenerator column. The regenerator column is coupled fluidly to and in fluid communication with the process side of the reboiler. The reboiler may be, for example, a once-through (one-pass) vertical thermosyphon reboiler, although other reboiler configurations may be used.

Figure 1:
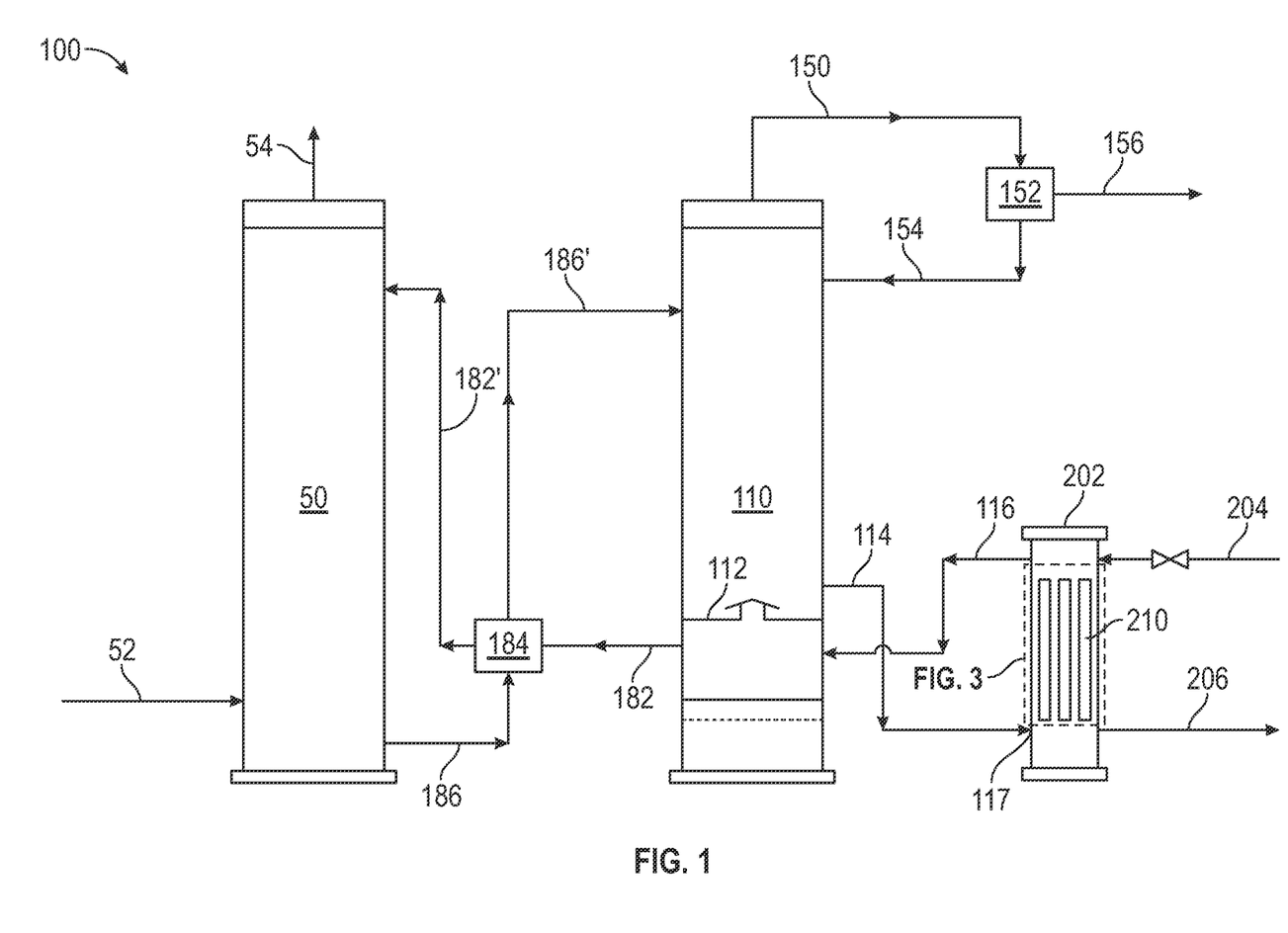
FIG. 1 shows a representation of a system with an absorber column, a regenerator column, and a reboiler, according to one or more embodiments.

FIG. 1 illustrates a schematic representation of an ATU system. FIG. 1 depicts an absorber column 50, a regenerator column 110, and a reboiler 202 (dotted lines representing expanded inset of reboiler 202 in FIG. 3, to be described).

The absorber column 50 traps acid gas from a natural gas feed (sour gas feed) with the lean alkanolamine solution and generates a purified natural gas and a rich alkanolamine solution. This acid gas extraction process is known as a sweetening process.

In the absorber column 50, a natural gas feed 52, including acid gas and light hydrocarbons, flows upward, while the lean alkanolamine solution flows downward. The absorber column 50 receives a lean alkanolamine feed 182' (lean alkanolamine solution) at the top of the column. The acid gas stream and lean alkanolamine solution intimately intermingle in the absorber column 50, where acid gas components are absorbed by the lean alkanolamine solution. From this interaction, a rich alkanolamine solution (rich alkanolamine feed 186) and a purified natural gas 54 results. The rich alkanolamine solution is rich with acid gas, meaning that it includes acid gas components at a higher concentration than in the lean alkanolamine solution. The "acid gas components" may include $CO_2$, $H_2S$, COS, and other typical acid gases. The acid gas components and alkanolamines may form complexes (an acid gas-alkanolamine complex).

From the absorber column 50, purified natural gas 54 passes to other processes, where it may be further processed or discharged from the system 100. Following the acid gas extracting process (sweetening process), the rich alkanolamine solution is passed to the hot side of the process, the regenerator column 110, via rich alkanolamine feed 186. The rich alkanolamine feed may pass through an intermediary exchanger 184, such as a lean/rich alkanolamine exchanger. In some instances, further processing equipment may be installed between the absorption column and the regenerator column, such as a hydrocarbon flash drum (not shown in FIG. 1).

Heating within the regenerator column 110 breaks apart the acid gas-alkanolamine complex of the rich alkanolamine solution and regenerates both the alkanolamine as a lean alkanolamine solution and the acid gas.

The regenerator column receives a warm, rich alkanolamine solution at the top of the column via regenerator column feed 186'. As depicted in FIG. 1, the regenerator column feed 186' passes from an intermediary exchanger 184, such as a lean/rich alkanolamine exchanger. However, regenerator column feed 186' (rich alkanolamine solution) may pass from another suitable source, such as directly from the absorption column, a hydrocarbon flash drum, or other known source of rich alkanolamine solution in an ATU system.

As acid gas components are separated from acid gas-alkanolamine complexes in the regenerator column, a lean alkanolamine solution is formed. The lean alkanolamine solution condenses and falls to the bottom of the regenerator column. Lean alkanolamine solution passes from the regenerator column as a lean regenerator column bottoms feed 182. The lean regenerator column may pass through an intermediary exchanger 184 and back to the absorber column 50 as lean alkanolamine feed 182'.

In the regenerator column 110, non-condensable acid gas components (and a portion of alkanolamines and alkanolamine complexes) pass from the top of the column via overheads stream 150. A condenser and reflux drum 152 may be provided to recover lean alkanolamine recovered with overheads stream 150. This recovered lean alkanolamine solution may be passed back to the regenerator column 110 as lean alkanolamine top feed 154 (reflux). The remaining acid gas components 156 are passed from system 100 and may be further processed. Thus, the top of the regenerator column 110 may receive an alkanolamine solution via lean alkanolamine top feed 154.

Rich alkanolamine solution comprising acid gas components (regenerator column feed 186') is introduced to the regenerator column 110 from the absorber column 50. Heat is applied in the regenerator column to free the acid gas components from the rich alkanolamine solution. As acid gas components are removed from the rich alkanolamine solution, the lean alkanolamine solution is regenerated in the cycle and a lean alkanolamine solution is recovered. Acid gas components from the regenerator column 110 may be further processed into useful products or catalytically converted and/or discharged (passed) from the system.

In one or more embodiments of system 100 (as shown in FIG. 1), reboiler feed 114 is passed from a fluid accumulation tray 112 in the regenerator column 110. The reboiler feed 114 is above the hot syphon discharge point 117, where the feed enters the bottom of the reboiler 202. The regenerator column 110 receives a warm, lean alkanolamine solution as a heated two-phase product feed 116. In FIG. 1, the regenerator column 110 is fluidly coupled to the absorber column 50.

The reboiler 202 has a process side and a shell side (heating side or steam side). The process side of the reboiler 202 is fluidly coupled to the regenerator column 110 (reboiler tubes 210 having a process side, inner surface, are shown in FIG. 1). The reboiler 202 is configured to receive warm lean alkanolamine solution as a single phase (liquid), and to pass hot lean alkanolamine solution as a two-phase (liquid and gas) mixture to the regenerator column 110. When the lean alkanolamine solution is heated or boiled at specific parameters, a natural heated ('thermo') syphon effect is created. The heated two-phase product feed 116 (liquid and vapor) from the top of the reboiler is passed to the regenerator column 110 at a position below the fluid accumulation tray 112. The syphon effect of the reboiler is aided by the position of the reboiler feed being above the hot syphon discharge point 117 relative to the position of the heated two-phase product feed 116 that is below the hot syphon discharge point.

The shell side (heating side) of the reboiler 202 is coupled fluidly to and in fluid communication with a steam source on the shell side. The steam provides heat to the outer surface of the reboiler tubes, thereby transferring heat through the reboiler tubes to the process side and the lean alkanolamine solution on the process side. Steam feed 204 is passed to the shell side at the top of the reboiler, where it condenses on the outside of the reboiler tubes 210 and passes from the reboiler at steam exit 206 and from system 100.

Additionally, secondary components (not shown) may be included in the system. For example, the regenerator column may be configured to pass acid gas or a portion thereof to a sulfur recovery unit (SRU). As another example, a filtration device may be included that reduces total suspended solids (TSS) in the solution. As yet another example, a thermal reclaimer may be included that reverses undesired chemical byproducts (such as urea) by boiling off the alkanolamine in a kettle reboiler, which is separate from the reboiler associated with the regenerator column. One of ordinary skill in the art would appreciate various other purification components and secondary components that may be included in an alkanolamine gas treatment unit system for acid gas removal.

Absorbent Regenerator System

Figure 2:
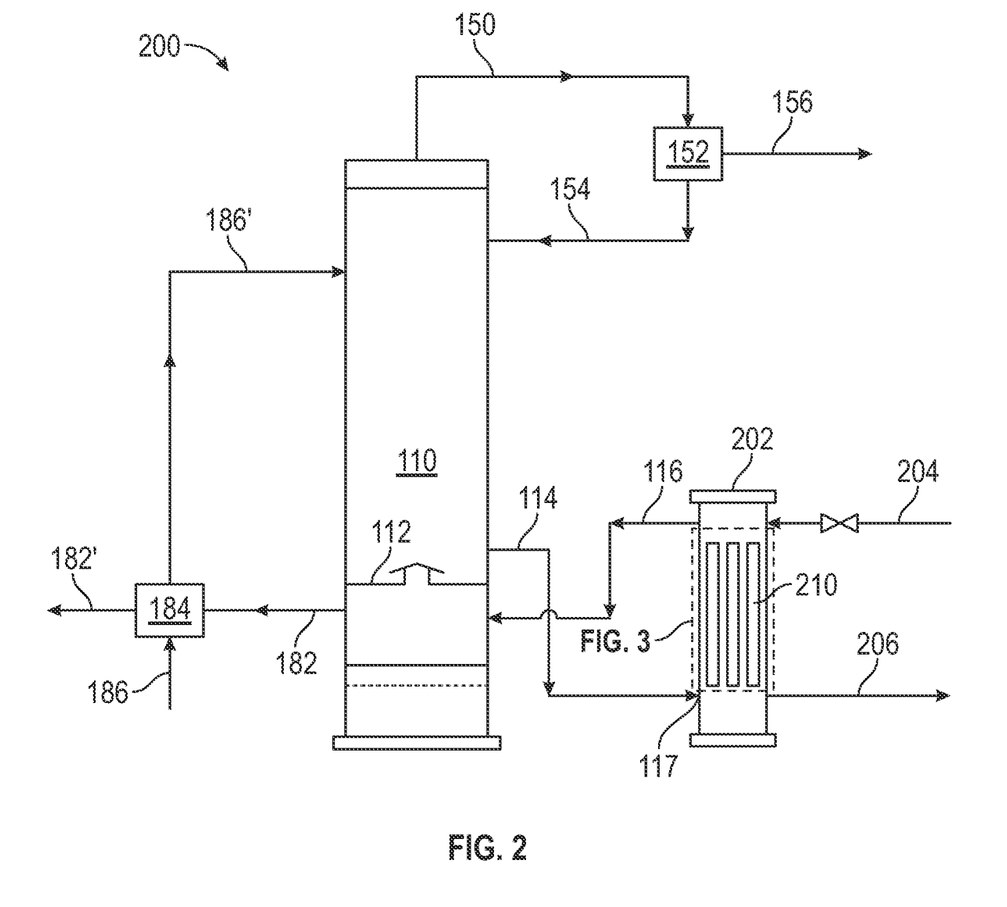
FIG. 2 shows a representation of a system with a regenerator column and a reboiler, according to one or more embodiments.

In one or more embodiments, an absorbent regenerator system 200 is provided for acid gas removal, including a regenerator column and a reboiler, as shown in FIG. 2, where like numerals represent like parts.

In one or more embodiments, the reboiler is a once-through natural circulation vertical thermosyphon reboiler. "Once-through" means that the lean alkanolamine solution (and water) passes through once per cycle. Steam is processed on the shell side of the reboiler. Lean alkanolamine solution is processed on the process side of the reboiler. "Natural circulation" means a non-forced circulation (such as forced by a pump). "Vertical" means that the reboiler has a configuration where the tubes are aligned such that process fluid flows vertically.

In a once-through design, flow is created in part by buoyancy forces that push the process fluid upward in the reboiler tubes. These buoyancy forces are from a density gradient that is induced by temperature and density differences between the reboiler bottoms liquid and the reboiler outlet two-phase mixture (liquid-vapor mixture). Due to pumpless nature of flow in thermosyphon reboilers, fluid circulation and heat transfer are coupled. Thus, the regenerator column tower bottoms are effectively siphoned with heat ("thermosyphon") to provide fluid flow to the reboiler.

Figure 3:
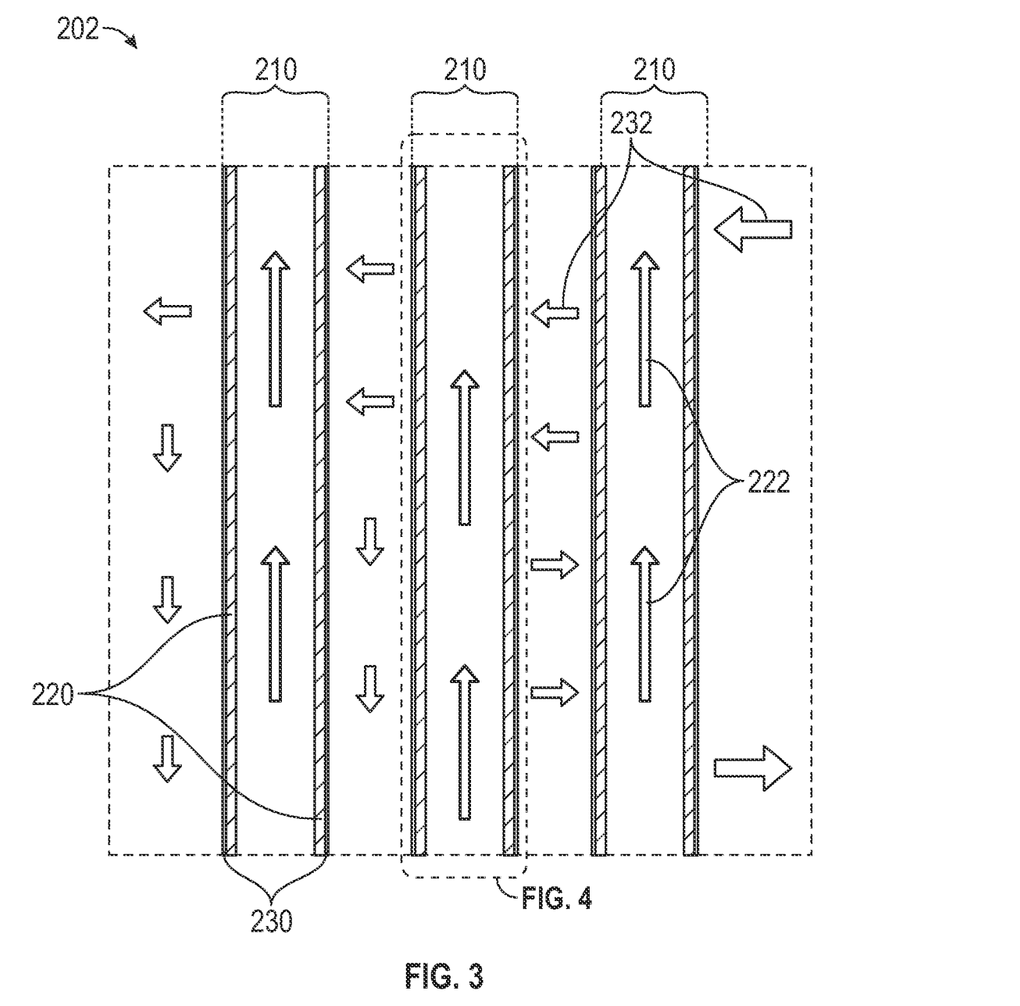
FIG. 3 shows a representation of a reboiler, according to one or more embodiments.

FIG. 3 shows an expanded view of a reboiler 202 as shown in FIGS. 1 and 2. The reboiler includes reboiler tubes 210. The roughened inner surface 220 of the tubes is shown, along with the tube wall 230 (outer tube surface). The direction of steam flow 232 and of the direction of process fluid flow 222 on the process side of the reboiler are depicted with arrows.

Although a forced circulation (pump-driven) reboiler may be used for the system, a forced circulation reboiler may have more efficient heat transfer than a natural circulation reboiler. Accordingly, advantageous effects of one or more embodiments of the disclosure may be negligible when applied to a forced circulation reboiler. A similar case exists with other types of reboilers, such as horizontal thermosyphon or kettle type reboilers.

In one or more embodiments, the internal surface of the reboiler tube is roughened. A "rough" surface is defined as a surface roughness of about 0.06 µm or greater, such as greater than or equal to 0.06 µm. In comparison, a "smooth" surface is defined as a surface roughness that is less than about 0.06 µm, such as less than 0.06 µm. Embodiments herein may include an internal surface of the reboiler tube that has a surface roughness in a range from a lower limit of 0.06 µm, 0.1 µm, 0.2 µm, 0.4 µm, 0.5 µm, 0.7 µm, 1.0 µm or 1.3 µm to an upper limit of 0.5 µm, 0.8 µm, 1 µm, 1.2 µm, 1.5 µm, 2 µm, 2.5 µm, or 3 µm.

The rough surface may extend over the entire inner tube area of the reboiler, on the process side of the reboiler. For example, the surface roughness may extend at least halfway up the height of the reboiler tube, from the bottom of the reboiler tube. For example, the surface roughness may extend up the entire height of the reboiler tube. The height of the reboiler tube is the entire height—from bottom to top. As previously described, the roughened inner surface of the reboiler tubes promote or facilitate boiling of the mixture, for example, by increasing nucleate heat transfer coefficients compared to an inner surface that is not roughened. The release of absorbed acid gases and heat transfer may be performed at a lower temperature, such as below a maximum reboiler tube process side skin temperature of 135° C. or less, such as less than 132° C. These temperatures reduce or prevent degradation of an alkanolamine, even at the entry point in the tube. For example, the roughened inner surface of the reboiler tube may accelerate a transition from sensible heat of a single-phase boiling mechanism (convective boiling) to a two-phase boiling mechanism (nucleate boiling). Because the surface may allow use of a lower temperature even at the entry point of the tube, it is envisioned that surface roughness extending at least halfway up the height of the reboiler tube is sufficient to provide the desired effects of reduced boiling temperature and lower degradation rates. A higher tube surface roughness will thus minimize solvent losses, reduce steam consumption, and enhance process integrity compared to an inner tube surface that is not roughened.

A roughened surface may be an etched surface, such as would result with acid-etching, or a synthetic surface, such as would result from the addition of nanostructured particles on the inside of the tubing. Where the roughened inner surface is synthetic, the surface includes nanoparticles attached to the inner surface of the tubes, such as a nanoparticle deposit. Such a nanoparticle deposit is configured to withstand the temperature, pressure, and liquid and vapor flow on the process side of the reboiler tube.

The rough inner surface of the reboiler tubes effectively increase the surface area on the process side by increasing the area of heat transfer. The surface roughness creates points of nucleation that facilitate bubble formation (vapor) and phase transition (liquid to vapor) during boiling processes, thereby promoting nucleate boiling. Facilitation of nucleation and nucleate boiling may permit less heat input (or controlled heat input) into the alkanolamine solution compared to a reboiler without the increased surface roughness. The end result is a reduction in an amount of alkanolamine degradation (irreversible conversion of alkanolamines).

Method of Use

A method of using the reboiler includes introducing steam to the shell side of the reboiler. The steam may be saturated. The method includes operating the system such that lean alkanolamine solution (aqueous) is introduced into the process side of the thermosyphon reboiler, where it contacts the roughened interior surface of the tubes. The reboiler produces a boiling mixture of a two-phase (vapor and liquid) lean alkanolamine solution. The ratio of vapor to liquid from the reboiler ranges from 10 to 15% by mass, where the vapor phase mostly constitutes water.

The reboiler is configured to permit fluid to vaporize by the following mechanism: a series of two-phase flow patterns develop inside the tubes (process side). The series starts with a bubbly flow, followed by a slug flow, a churn flow, an annular flow, and finally a mist flow. The variation of two-phase flow manipulates the film resistance near the wall and effectively the heat transfer coefficient. The film resistance reflects a thermal layer with a boundary extending from the wall to the fluid near the wall (where the fluid near the wall is formed by behavior of fluid as it approaches or intermingles with the wall). The type of two-phase fluid determines the magnitude of thermal boundary layer. The thermal boundary layer is inversely proportional to heat transfer. For example, heat transfer at a surface during convective boiling consists of conduction of heat only, whereas heat transfer at a surface during nucleate boiling includes conduction of heat and vapor phase transfer. The wall temperature at shell side is constant since steam is saturated. However, since two-phase behavior varies along the length of a reboiler tube, the heat flux (CHF) and heat transfer coefficient vary axially along the tube. The heat flux may be estimated based upon the temperature gradient and correlation of heat transfer coefficient.

If the heat flux is insufficient, the required degree of vaporization will not be achieved, and the regenerator column (amine stripper column) will not operate effectively. This is because the acid gases will not be stripped (removed)

from the alkanolamine solution per one or more embodiments of the method, which may lead to higher lean acid gas loading and limitation of sour gas treatment as compared to acid gases that are stripped from the alkanolamine solution.

Figures 4, 4A:
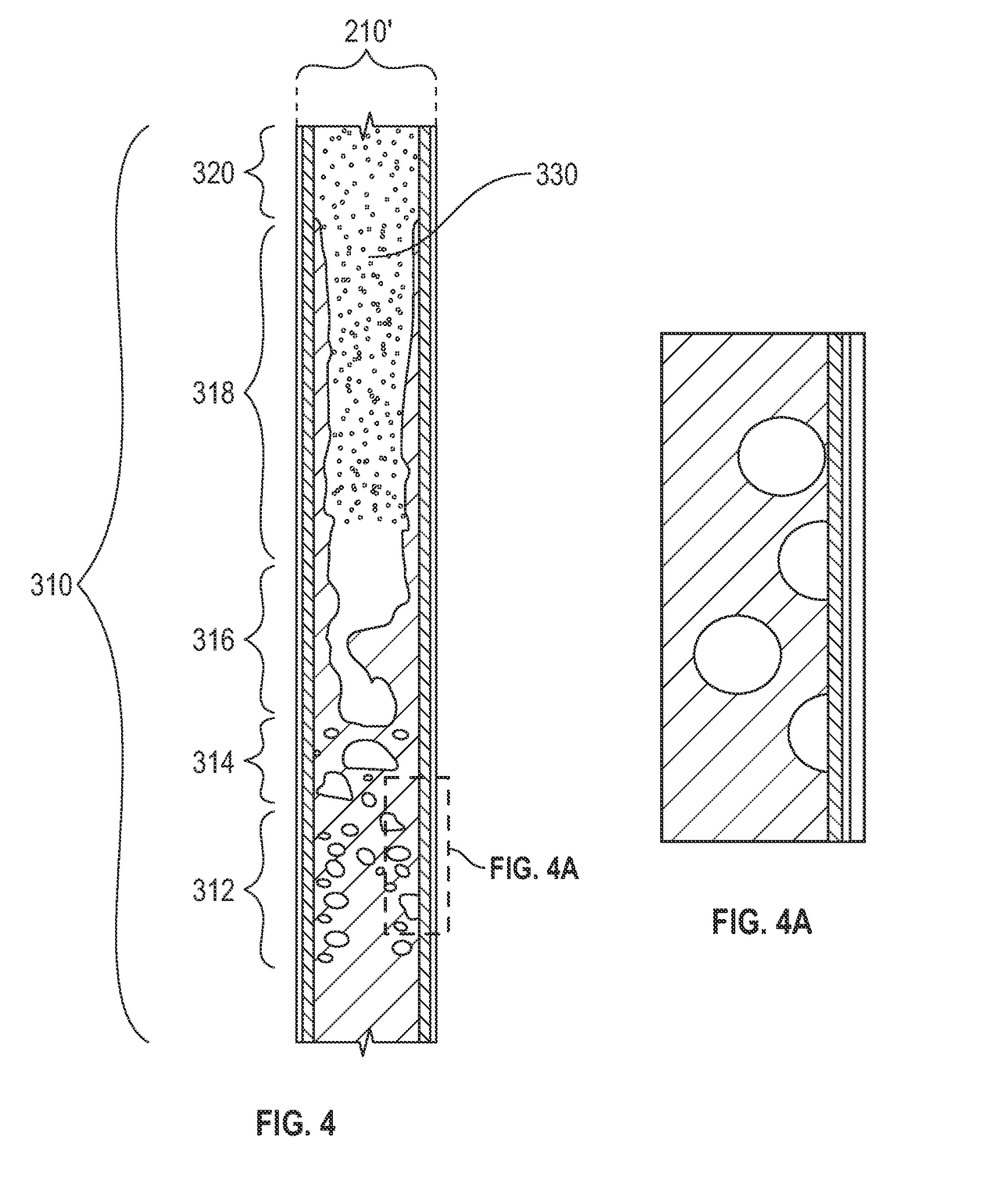
FIGS. 4 and 4A show a representation of a reboiler tube boiling an aqueous alkanolamine solution, according to one or more embodiments.

FIG. 4 shows a reboiler tube 210' (as shown in, for example, FIG. 3) including a lean alkanolamine solution. The boiling region 310 extends along the length of the reboiler tube. Toward the bottom of the reboiler tube, a two-phase flow pattern begins to develop, as shown in FIGS. 4 and 4A. Toward the top of the reboiler tube, a two-phase flow 330 is provided and passes from the top of the tube. From the bottom of the reboiler tube, the two-phase flow pattern begins to develop with bubbly flow 312 followed by slug flow 314, then churn flow 316, and the two-phase flow pattern (two-phase flow) is developed with annular flow 318, and mist flow 320, as shown in FIG. 4.

The method may include operating the reboiler configured to control a temperature difference between the steam shell wall temperature (conductor temperature) and the process fluid temperature (saturation temperature of the fluid) of 5° C.<$\Delta T_{sat}$<30° C. The steam shell temperature is the wall superheat temperature ($\Delta T_{sat}$, or the excess temperature). In other words, $\Delta T_{sat}$ is the difference between the wall temperature, $T_{wall}$, and the saturation temperature, $T_{sat}$.

The method may include operating the stripper column to control a reboiler process side stream pressure of less than 20 psig, such as less than 19, 18, 17, 16, 15, 14, 13, or 12 psig. In some embodiments, the process side of the reboiler may be at a pressure in a range from about 5 psig to about 20 psig, such as in a range from about 5 or 7 psig to about 12 or 15 psig.

The method may include operating the reboiler at a low process side stream temperature. For example, the method may include operating the reboiler to control a reboiler process side (bulk flow) stream temperature of less than or equal to 135° C., such as less than 134° C., 133° C., 132° C., 131° C., 130° C., 129° C., 128° C., 127° C., 126° C., 125° C., 124° C., 123° C., 122° C., 121° C., 120° C., 119° C., or 118° C. In some embodiments, the reboiler is operated to have a maximum process side (bulk flow) stream temperature of 135° C., 134° C., 133° C., 132° C., 131° C., or 130° C., for example, so as to limit or minimize degradation of the alkanolamine. In some embodiments, the process side of the reboiler may be operated at a process side (bulk flow) stream temperature in a range from about 100° C. to about 140° C., such as from a lower limit of 105° C., 110° C., 115° C., 120° C., 125° C., or 130° C., to an upper limit of 130° C., 132° C., 134° C., 135° C., 136° C. or 137° C.

In some embodiments, the maximum temperature on the process side may be a skin temperature (temperature of the alkanolamine solution at the interface with the reboiler tubes). Methods herein may also include operating the reboiler to control a maximum reboiler tube process side skin temperature to less than 135° C., less than 134° C., 133° C., 132° C., 131° C., or less than 130° C., for example. In some embodiments, the process side of the reboiler may be operated at a process side skin temperature in a range from about 100° C. to about 140° C., such as from a lower limit of 105° C., 110° C., 115° C., 120° C., 125° C., or 130° C., to an upper limit of 130° C., 132° C., 134° C., 135° C., 136° C. or 137° C. The bulk temperature of the circulating alkanolamine solution may be less than the maximum skin temperature. Limiting the skin temperature in this manner will minimize degradation, as noted above.

As noted above, the skin temperature of the alkanolamine solution within the reboiler tubes is desired to remain below a temperature at which significant degradation occurs, such as below 135° C., less than 134° C., less than 133° C., less than 132° C., less than 131° C., or less than 130° C., or other temperatures as appropriate for the amine being used. As also noted above, the temperature of the heat transfer fluid used on the shell side of the reboiler should be sufficiently high to transfer enough heat for proper column operations and stripping of the adsorbent, while low enough so as to not exceed the maximum desired process skin temperature. The shell side temperature may thus depend upon the heat transfer fluid used, such as steam, flow rates on the process side, as well as tube thickness and tube type/conductivity.

As a result of these controlled conditions, alkanolamine degradation in the process fluid is reduced, compared to a method that does not include operating a system with the reboiler of one or more embodiments.

The outlet temperature of lean alkanolamine solution from the regenerator column is determined by regenerator column overhead pressure in addition to tray overall pressure, along with lean alkanolamine concentration. The outlet lean alkanolamine temperature (for example, lean alkanolamine feed 182 in FIGS. 1 and 2) is the saturated fluid temperature at its exit pressure. Normally, the overhead pressure of regenerator column is about 207 kilopascal (kPa) (30 pound force per square inch (psia)), while the tray pressure drop is about 14 kPa (2 pounds per square inch (psi)).

In the reboiler, where diglycolamine concentration, for example, is 40 weight percent (wt %), the process side tube outlet temperature (heated two-phase product feed 116 in FIGS. 1 and 2) would be about 126° C. (about 259° F.). On the other hand, the process side tube inlet temperature (reboiler feed 114 in FIGS. 1 and 2) is less than the tube outlet temperature by about 1.1° C. (about 3.5° F.) in this scenario, or about 124° C. (about 255.5° F.). The vapor fraction of a reboiler return may range from 10 to 15 wt %, while the method of one or more embodiments allows for reaching the vapor fraction range of the reboiler return while avoiding thermal degradation.

In one or more embodiments, the shell side fluid is saturated steam (water). Accordingly, both inlet steam temperature (steam feed 204 in FIGS. 1 and 2) and outlet steam temperature (steam exit 206 in FIGS. 1 and 2) are equal and ideally less than 177° C. (350° F.), such as less than 160° C., less than 155° C., less than 145° C., less than 140° C., less than 137° C., or less than 135° C. The saturated steam temperature is characterized with its shell pressure, which varies based upon the heat flux required for a particular vaporization mechanism of fluid on the process side.

EXAMPLES

Theoretical calculations were performed to analyze the effect of surface roughness on nucleate heat transfer coefficient, overall heat transfer coefficient, alkanolamine thermal degradation rate, and solvent losses. The Examples take into account one or more embodiments of the system and method, for example, surface roughness of the reboiler tubes, system operational temperatures and pressures, and a solution of water and alkanolamine.

Example 1

Theoretical calculations were performed to analyze nucleate heat transfer coefficient and overall heat transfer coefficient. It was found that increasing surface roughness of the process side of the reboiler tubes from a base of 0.04 micrometers (μm) to about 1.9 μm enhances nucleate heat transfer coefficient by 67%, while overall heat transfer coefficient is enhanced by 21%.

Example 2

Next, theoretical calculations were performed to analyze the degradation kinetics of an aqueous alkanolamine solution. The calculations included rich alkanolamines, such as an acid gas-alkanolamine complex. Specifically, the alkanolamine used in Example 2 was diglycolamine (DGA) and the adduct was a $CO_2$-alkanolamine complex. However, the calculations may apply to other rich alkanolamines complexes, including other acid gases (such as $H_2S$ and COS) and other alkanolamines (MEA, DEA, and morpholine).

The results showed that the enhanced nucleate heat transfer coefficient and overall heat transfer coefficient may reduce the thermal degradation rate of alkanolamine at a film position (if present) by 31% molar quantity per hour (units of thermal degradation rate measured in molar quantity per hour, such as mmol/h), and thermal degradation rate of alkanolamine at the wall position (inner surface of the reboiler tubes) by 50% molar quantity per hour (if a film is not present). This advantageous base improvement of a 31% molar quantity per hour reduction in thermal degradation rate at a film position is provided by the system and method of one or more embodiments, regardless of boiling mechanism. In this instance, a film (or layer) may relate to a layer of stagnant gas or liquid on the inner surface of the reboiler tubes.

According to Example 2, an improvement of 19% thermal degradation rate may be provided under a boiling mechanism that does not include a film or layer (50% thermal degradation reduction), such as nucleate boiling, as compared to a boiling mechanism where a fluid (gas or liquid) film or layer is present (31% thermal degradation reduction).

Flow control of steam in an ATU system relies on regenerator column overhead temperature. Maintaining overhead temperature includes maintaining a constant mass flowrate of vapor through the regenerator column. Accordingly, there may be a constant heat flux from steam on the shell side to the inner tube surface on the process side. It is envisioned that constant heat flux from the steam shell to the process fluid may be provided under nucleate boiling conditions, where no stagnant liquid layer or persistent vapor film is present. In other boiling mechanisms (convective, transition, or film boiling), the heat flux may not be constant from steam shell to process fluid. Thus, heat flux to the process fluid may improve efficiency of the reboiler, as previously described, and may decrease alkanolamine degradation compared to a heat flux that is inconsistent.

Example 3

As previously described, degradation of alkanolamine in a system for acid gas removal may result in solvent losses and associated costs.

Example 3 is a comparison of DGA solvent losses from an ATU system, showing results with and without a reboiler of one or more embodiments.

Total DGA losses within 1 year across multiple natural gas plants due to morpholine formation (from alkanolamine degradation) were 56,250 gallons. Of these losses, 68 volume % of morpholine formation occurred at sites having a conventional amine gas treatment unit (without an ATU system of one or more embodiments). The conventional unit is configured to utilize 1725 kilopascal (Kpa) (or 250 pound-force per square inch, psig) of steam in the reboilers and a temperature of 207.8° C. This causes excessive alkanolamine degradation due to high shell temperature.

Theoretical calculations were performed to analyze the effect of the system and method of one or more embodiments on solvent losses. With the ATU system of one or more embodiments applied to these natural gas plants, it is expected that alkanolamine degradation drops to 35,000 to 40,000 gallons and would save about $670,000 in yearly operating costs across multiple natural gas plants, from decreased solvent losses. Thus, the system and method of one or more embodiments reduces solvent losses in a natural gas plant as compared to a natural gas plant without the system and method of one or more embodiments.

Advantageous Effects

As shown in the examples, a greater surface roughness on the process side of the reboiler improves the heat transfer coefficient. Without wanting to be bound by theory, it is believed that the density of nucleation sites improves the rate of heat transfer in a system or method of one or more embodiments. Advantageously, this also reduces surface temperature and therefore alkanolamine degradation in an aqueous alkanolamine solution.

In general, one or more embodiments herein minimize skin temperature inside the reboiler. Skin temperature is the temperature of the inner surface of the reboiler tubes. However, the heat transfer coefficient range depends upon the level of roughness on the inner tube surfaces One or more embodiments of the present disclosure provide for an increase in heat transfer coefficient by 67% with roughened inner surface of reboiler tubes, as compared to a reboiler without the surface roughness.

One or more embodiments of the present disclosure provide minimized solvent losses due to chemical degradation of alkanolamine, reduced steam flowrate consumption, and increased process integrity by reducing lean acid gas loading.

The reboiler having a roughened inner surface of the tubes may increase operational flexibility in terms of steam consumption along with other advantages compared to a conventional reboiler. For example, the thermal degradation rate of alkanolamine may be reduced by 31% to 50%, steam consumption rate may be reduced by 1.4%.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it should be understood that another one or more embodiments is from the one particular value to the other particular value, along with all particular values and combinations thereof within the range.

Although a few example embodiments have been described in detail, those skilled in the art will readily appreciate that many modifications are possible in the example embodiments without materially departing from this disclosure. All modifications of one or more disclosed embodiments are intended to be included within the scope of this disclosure as defined in the following claims. In the claims, means-plus-function clauses are intended to cover the structures previously described as performing the recited function and not only structural equivalents, but also equivalent structures. It is the express intention of the applicant not to invoke 35 U.S.C. § 112(f) for any limitations of any of the claims, except for those in which the claim expressly uses the words 'means for' together with an associated function.

It is noted that one or more of the following claims utilize the term "where," "wherein," or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open-ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of." The words "comprise," "has," and "include" and all grammatical variations thereof are each intended to have an open, non-limiting meaning that does not exclude additional elements or steps.

While one or more embodiments of the present disclosure have been described with respect to a limited number of embodiments, those skilled in the art, having benefit of this disclosure, will appreciate that other embodiments can be devised, which do not depart from the scope of the disclosure. Accordingly, the scope of the disclosure should be limited only by the attached claims.

What is claimed is:

1. An alkanolamine gas treatment unit system, comprising:
   an absorber column;
   a regenerator column;
   a once-through natural circulation vertical thermosyphon reboiler comprising a reboiler tube and a shell; and
   an alkanolamine solution, wherein the alkanolamine solution includes an alkanolamine and water, wherein the alkanolamine is diglycolamine (DGA);
   wherein the reboiler is steam driven having a process side and a shell side,
   wherein the process side is inside the reboiler tube,
   wherein the process side of the reboiler and the regenerator column are in fluid communication with one another,
   wherein an inner surface of the reboiler tube, on the process side, has a surface roughness of 0.06 µm-3.0 µm,
   wherein the shell side of the reboiler is in fluid communication to a steam source, and
   wherein the regenerator column and the absorber column are in fluid communication with one another.

2. The system of claim 1, configured to control a reboiler process side stream pressure of less than 20 psig.

3. The system of claim 1, configured to control a reboiler process side stream temperature of less than 135° C.

4. The system of claim 1, configured to control a maximum reboiler tube process side skin temperature to 135° C. or less.

5. The system of claim 1, wherein a portion of the inner surface of the reboiler tube having the surface roughness extends at least halfway up a height of the reboiler tube.

6. The system of claim 1, wherein a portion of the inner surface of the reboiler tube having the surface roughness extends up an entire height of the reboiler tube.

7. The system of claim 1, where the surface roughness of the inner surface of the reboiler tube comprises an etched surface or a nanoparticle deposit.

8. An absorbent regenerator system, comprising:
   a regenerator column;
   a once-through natural circulation vertical thermosyphon reboiler comprising a reboiler tube and a shell; and
   an alkanolamine solution, wherein the alkanolamine solution includes an alkanolamine and water, wherein the alkanolamine is diglycolamine (DGA);
   wherein the reboiler is steam driven having a process side and a shell side,
   wherein the process side is inside the reboiler tube,
   wherein the process side of the reboiler and the regenerator column are in fluid communication with one another,
   wherein an inner surface of the reboiler tube, on the process side, has a surface roughness of 0.06 µm-3.0 µm,
   wherein the shell side of the reboiler is in fluid communication to a steam source, and
   wherein the regenerator column and the absorber column are in fluid communication with one another.

9. The system of claim 8, configured to control a reboiler process side stream pressure of less than 20 psig.

10. The system of claim 8, configured to control a reboiler process side stream temperature of less than 135° C.

11. The system of claim 8, configured to control a maximum reboiler tube process side skin temperature to 135° C. or less.

* * * * *